Patented Mar. 27, 1945

2,372,299

UNITED STATES PATENT OFFICE 2,372,299

SYNTHETIC RUBBER COMPOSITION

Robert D. Snow, Bartlesville, Okla., assignor to Phillips Petroleum Company, a corporation of Delaware No Drawing. Application March 24, 1941,
Serial No. 385,007

26 Claims. (Cl. 260—36)

This invention relates to the softening and plasticizing of synthetic, rubber-like materials. It relates particularly to the softening and plasticizing of such materials which are initially oil-resistant, and more particularly to such materials which are prepared by direct polymerization of butadiene hydrocarbons or by the copolymerization of butadiene hydrocarbons with other comonomers, such as acrylic acids, acrylates, acrylonitriles, etc. The invention relates further to softened and plasticized rubber-like materials so produced.

Much work has been done for a number of years to produce synthetic materials which will supplant or supplement natural rubber. While much of this work was originally directed to producing "synthetic" rubber, in more recent years it has been recognized that a true "synthetic" rubber may be impossible of attainment. However, today many synthetic rubber-like materials have been produced, and are being produced on a commercial scale, and these materials are commonly termed "synthetic rubbers." It is with this more recent use in mind that the term "synthetic rubber" will be used in the present specification and claims.

Natural rubber is quite extensively affected when placed into contact with hydrocarbons. It may be dissolved by aromatic and the like hydrocarbons, and even when in contact with low-boiling paraffin hydrocarbons it absorbs them extensively, attaining a consistency of gel-like materials and losing most if not all mechanical strength. Most commercial articles made from natural rubber are similarly affected by hydrocarbons, and care must be used to limit or prohibit contact of such articles with hydrocarbon materials. Thus, much trouble has been experienced with hose for gasoline pumps, with rubber-soled shoes around refineries, gasoline stations and the like, and with many other commercial articles. One of the largest uses for rubber is found in the production of automobile tires, and the treads of these when in prolonged contact with hydrocarbon materials, or when traveling over freshly oiled roads, when used in oil fields where oil may be on the ground, and the like, are adversely affected.

In the manufacture of many commercial articles from crude rubber, it is a common practice to use a softener or plasticizer. The use of softeners of types such as pine tar, Burgundy pitch, factice, coal tar, and aromatic hydrocarbons to assist the compounding of rubber with fillers and pigments and facilitate the extrusion of the finished compound is old in the art of rubber compounding.

The newer synthetic rubbers impose stricter demands on the softener. These rubbers, particularly the synthetic rubbers produced by the copolymerization of a butadiene and an acrylonitrile, are drier and more nervy in milling characteristics and do not break down nearly so readily as natural rubber. The need for softeners is consequently greater. On the other hand, these synthetic rubbers are far more resistant to, and less compatible with, the usual solvents such as animal and vegetable oils, petroleum and coal-tar fractions, and similar cheap and abundant organic materials used as softeners for natural rubber. The result is that compounders of the new synthetic rubbers have had to adopt more expensive synthetic organic materials such as dibenzyl ether, esters of phthalic acid, and triaryl phosphates, aldonaphthylamine resin, and cyclohexanone for softening the new synthetic rubbers.

I have now found that crude synthetic rubbers can be compounded satisfactorily with $SO_2$-olefin-resin oils, to be more specifically described hereinafter. I have further found that oil-resistant, synthetic rubber products can be formed by the compounding of a crude synthetic rubber with an $SO_2$-olefin-resin oil. I have further found that especially desirable products are produced by so compounding a synthetic rubber produced by the copolymerization of a butadiene with a derivative of an acrylic acid.

An object of this invention is to furnish new agents for softening synthetic rubber and rubber-like materials to facilitate the milling-in and dispersion of various other compounding ingredients such as carbon black, zinc oxide, clays, accelerators and vulcanizing agents.

Another object of this invention is to furnish new high-boiling solvents suitable for use in preparing cements and similar solutions of synthetic rubber-like materials, particularly butadiene synthetic rubbers.

A further object of this invention is the plasticizing and reduction of the nerve of synthetic rubbers, particularly those made from butadiene.

Further objects and advantages of my invention will become apparent, to those skilled in the art from the accompanying disclosure.

In my U. S. Patent 2,102,654, issued December 21, 1937, I have disclosed that new and useful substances may be prepared by treating or reacting polymeric sulfur dioxide-olefin complexes with aqueous or alcoholic alkali or alkaline-earth hydroxide solutions, ammonium hydroxide, liquid ammonia, and amines or other substituted ammonia compounds. The substances formed comprise acidic organic decomposition products and/or their salts, neutral oils or oily products and other organic decomposition products.

These neutral oils or oily products are formed when sulfur dioxide-olefin complexes or resins are reacted with strong alkalies such as sodium, lithium and potassium hydroxides and the like.

Solutions of substituted ammonium bases such as $(CH_3)_4NOH$ and the like may also be used. The exact nature or chemical formula of these oils is not known to me at this time. However, their method of preparation is known, as outlined in my aforementioned Patent 2,102,654, as well as a number of their physical characteristics. For example, the oils contain carbon, hydrogen, sulfur, and oxygen. As an example of the physical properties of these oils, the neutral oil produced by reacting a complex or resin of sulfur dioxide and 2-butene with caustic boils at 274–276° C., has a specific gravity of 1.113, and a molecular weight between 169 and 180. These oils may be prepared from practically any sulfur dioxide-olefin complex or resin, but they are preferably prepared in quantities from resins formed by the reaction of sulfur dioxide and olefin hydrocarbons having a terminal carbon atom which is not at one end of the double bond or olefin linkage. As an example, resins formed from sulfur dioxide and 2-butene, 2-pentene, 2-hexene and the like, can be reacted with an approximately 24–25 per cent aqueous solution of a strong alkali, and a neutral oil can be extracted from the reaction products. Such oil will be formed in yields up to 40 per cent or more of the original $SO_2$-olefin resin. These oils are neutral as to acid or basic reaction and for the sake of simplicity such oils will be referred to herein and in the claims appended hereto as $SO_2$-olefin resin oils. Although such oils are generally prepared from resins formed from $SO_2$ and olefins, other unsaturated compounds than olefins have been used in the preparation of such resins, such as butadiene, diallyl, allyl cyanide, vinyl chloride, allyl chloride, undecylenic acid, and others known to the art. It is intended to include oils prepared from such resins in the term $SO_2$-olefin resin oils, as will be appreciated from my Patent 2,102,654.

Synthetic rubbers have been prepared from a large number of raw materials. Large amounts of synthetic rubber are being prepared today by the polymerization of butadienes, and especially by the polymerization of butadienes with other polymerizable materials. The butadienes finding most common use are butadiene itself (1,3-butadiene) and its methyl and dimethyl homologues, isoprene, piperylene, and 2,3-dimethyl-1,3-butadiene. Other materials copolymerized therewith (so-called comonomers) include isobutylene, styrene, unsaturated ketones such as methyl isopropenyl ketone (methyl methylene ethyl ketone), and the like, acrylic acid and its homologues and derivatives, especially the acrylates, the methacrylates, acrylonitrile, and methacrylonitrile. A somewhat different type of synthetic rubber has been produced by polymerization of halobutadienes, such as chloroprene, which is known as Neoprene or Duprene. A still different type of synthetic rubber is prepared by reacting together an ethylene dihalide, or a derivative thereof, with an alkali polysulfide, such as the product resulting from the reaction of ethylene dichloride and sodium polysulfide, and the like. Such synthetic rubbers are known as Thiokols. Other materials, which for some uses may be considered as being synthetic rubbers, are plasticized polymers of vinyl halides, such as polyvinyl chloride, and these synthetic materials may likewise be treated with $SO_2$-olefin-resin oils according to my invention.

All such synthetic rubbers may be treated with an $SO_2$-olefin-resin oil in accordance with the present invention. Some of these synthetic rubbers are much more oil-resistant than others, and when compounded in accordance with the present invention an oil-resistant synthetic rubber product results. When crude synthetic rubbers of low oil resistance are employed, the product, after compounding with an $SO_2$-olefin-resin oil, often has a greater oil resistance, especially towards the more saturated oils. Thus, the $SO_2$-olefin-resin oils may be regarded as relatively nonvolatile, oil-resisting softeners. (See Stoklin, Trans. I. R. I., 15, 58 (1939).) They also have an effect of imparting tack, and at times assist in extruding.

The amount of $SO_2$-olefin-resin oil to be used in compounding synthetic rubber will depend upon the particular $SO_2$-olefin-resin from which the oil is prepared, upon the crude synthetic rubber being treated, and upon the characteristics desired in the final product. In most cases the amount of $SO_2$-olefin resin oil to be used will be between about 5 and 35 per cent of the final product. In some instances these oils may be used in conjunction with other softeners, and lubricants. The $SO_2$-olefin-resin oils are preferably added before, or during, the incorporation with the crude synthetic rubber of fillers and pigments, such as carbon black, wood flour, zinc oxide, etc. However, in its broadest sense, my invention is not to be limited to any specific method of compounding or specific proportion of $SO_2$-olefin-resin oil.

In the preparation of some products, two or more different synthetic rubbers may be compounded together. Also, at times, some natural rubber may be included in the compounding, but in this case the final product should be made up of a sufficient amount of a synthetic rubber as to be considered primarily a synthetic rubber product.

In preparing cements and similar compositions which comprise synthetic rubbers, and especially those prepared from a synthetic rubber in the preparation of which a butadiene has been employed, the $SO_2$-olefin-resin oils are useful as high-boiling solvents. In the preparation of these products volatile solvents are also used, and after the evaporation of these volatile solvents from the cement when it is used the presence of the $SO_2$-olefin-resin oil enhances the plasticity and stickiness of the remaining material.

The following are examples of methods of practicing my invention.

*Example 1*

A crude synthetic rubber was prepared by emulsion copolymerization of approximately equal proportions of butadiene and acrylonitrile. This was compounded, according to the following recipe, with an $SO_2$-olefin-resin oil prepared by decomposing with a caustic soda solution a resin prepared from sulfur dioxide and 2-butene.

| | Parts |
|---|---|
| Synthetic rubber | 100.0 |
| Channel carbon black | 50.0 |
| Zinc oxide | 5.0 |
| Age-Rite powder (phenyl-β-naphthylamine) | 1.0 |
| Stearic acid | 1.0 |
| $SO_2$-olefin-resin oil | 50.0 |
| Sulfur | 1.5 |
| Altax (benzothiazyl disulfide) | 1.5 |
| | 210.0 |

The resulting composition of matter was fairly soft, slightly tacky, and showed excellent carbon black dispersion. Plasticity tests made with the Goodrich plastometer gave the following values:

|  | Plasticity | Retentivity | Softness |
|---|---|---|---|
| 10 lb. weight at 35° C | 13.0 | 33.4 | 39.4 |
| 10 lb. weight at 100° C | 26.5 | 41.5 | 63.6 |

Rebound tests gave the following:

|  | Per Cent Schopper rebound |
|---|---|
| 30 min. at 310° F | 38 |
| 45 min. at 310° F | 37 |

The compound cured in thirty minutes at 310° F. with good elongation and fairly good tensile strength. Cure tests were follows:

| Cure min. at 310° F. | Load at 300% elongation | Tensile strength pounds per square inch | Per cent ultimate elongation |
|---|---|---|---|
| 10 | 500 | 2,500 | 680 |
| 20 | 750 | 2,600 | 590 |
| 30 | 770 | 2,800 | 600 |
| 45 | 1,050 | 2,350 | 490 |

A compound which was identical except that the usual softener, dibutyl phthalate, was used in place of the SO₂-olefin-resin oil gave the following tests:

|  | Plasticity | Retentivity | Softness |
|---|---|---|---|
| 10 lb. weight at 35° C | 10.0 | 25.6 | 39.2 |
| 10 lb. weight at 100° C | 16.4 | 28.0 | 58.7 |

Per cent Schopper rebound, 30 minutes at 310° F ---------------------------------- 40

| Cure min. at 310° F. | Load at 300% elongation | Tensile strength pounds per square inch | Per cent ultimate elongation |
|---|---|---|---|
| 10 | 300 | 2,000 | 700 |
| 20 | 800 | 2,020 | 550 |
| 30 | 900 | 2,100 | 450 |
| 45 | 1,000 | 1,800 | 400 |

The synthetic rubber product produced by compounding with the SO₂-olefin-resin oil in the above example has a sufficient resistance to the deleterious action of liquid hydrocarbons as to be definitely classified as an oil-resistant rubber.

*Example 2*

A crude synthetic rubber is prepared by copolymerizing butadiene and methyl methacrylate, in a ratio of about 2:1. The resulting synthetic rubber is compounded with an SO₂-olefin-resin oil in a manner similar to that given above, and an oil-resistant, synthetic rubber product of good elasticity and tensile strength results.

It is to be understood that my invention is not to be unnecessarily limited by the above examples, and that various modifications may be made by one skilled in the art in the light of the present disclosure without departing from the spirit of the disclosure or from the scope of the claims.

I claim:

1. In the preparation of a synthetic rubber product from a synthetic rubber consisting of a copolymer of a 1,3-butadiene hydrocarbon and an acrylic acid derivative selected from the group consisting of acrylic acid and methacrylic acid and nitriles and esters of said acids, the improvement which comprises compounding such a synthetic rubber with a neutral oil resulting from the treatment with an alkaline solution of a resin formed by the reaction of sulfur dioxide and an olefin.

2. The process as defined in claim 1 and further characterized in that the neutral oil is one resulting from the treatment with an alkaline solution of a resin formed by the reaction of sulfur dioxide and an olefin having no double bond at a terminal carbon atom.

3. The process as defined in claim 1 and further characterized in that the neutral oil is one resulting from the treatment with a sodium hydroxide solution of a resin formed by the reaction of sulfur dioxide and 2-butene.

4. In the preparation of an oil-resistant synthetic rubber product from a synthetic rubber consisting of a copolymer of a 1,3-butadiene hydrocarbon and acrylonitrile, the improvement which comprises compounding such a synthetic rubber with from approximately 5 to 35 per cent by weight of a neutral oil resulting from the treatment with an alkaline solution of a resin formed by the reaction of sulfur dioxide and an olefin.

5. The process as defined in claim 4 and further characterized in that the neutral oil is one resulting from the treatment with an alkaline solution of a resin formed by the reaction of sulfur dioxide and an olefin having no double bond at a terminal carbon atom.

6. The process as defined in claim 4 and further characterized in that the neutral oil is one resulting from the treatment with a sodium hydroxide solution of a resin formed by the reaction of sulfur dioxide and 2-butene.

7. In the preparation of an oil-resistant synthetic rubber product from a synthetic rubber consisting of a copolymer of 1,3-butadiene and acrylonitrile, the improvement which comprises compounding such a synthetic rubber with from approximately 5 to 35 per cent by weight of a neutral oil resulting from the treatment with a sodium hydroxide solution of a resin formed by the reaction of sulfur dioxide and 2-butene.

8. In the preparation of an oil-resistant synthetic rubber product from a synthetic rubber consisting of a copolymer of a 1,3-butadiene hydrocarbon and an ester of methacrylic acid, the improvement which comprises compounding such a synthetic rubber with from approximately 5 to 35 per cent by weight of a neutral oil resulting from the treatment with an alkaline solution of a resin formed by the reaction of sulfur dioxide and an olefin.

9. The process as defined in claim 8 and further characterized in that the neutral oil is one resulting from the treatment with an alkaline solution of a resin formed by the reaction of sulfur dioxide and an olefin having no double bond at a terminal carbon atom.

10. The process as defined in claim 8 and further characterized in that the neutral oil is one resulting from the treatment with a sodium hydroxide solution of a resin formed by the reaction of sulfur dioxide and 2-butene.

11. A composition comprising a synthetic rubber consisting of a copolymer of a 1,3-butadiene hydrocarbon and an acrylic acid derivative selected from the group consisting of acrylic acid and methacrylic acid and nitriles and esters of said acids, and a neutral oil resulting from the treatment with an alkaline solution of a resin formed by the reaction of sulfur dioxide and an olefin.

12. A composition comprising a synthetic rubber consisting of a copolymer of a 1,3-butadiene hydrocarbon and an acrylic acid derivative selected from the group consisting of acrylic acid and methacrylic acid and nitriles and esters of said acids, and a neutral oil resulting from the treatment with an alkaline solution of a resin formed by the reaction of sulfur dioxide and an olefin having no double bond at a terminal carbon atom.

13. A composition comprising a synthetic rubber consisting of a copolymer of a 1,3-butadiene hydrocarbon and an acrylic acid derivative selected from the group consisting of acrylic acid and methacrylic acid and nitriles and esters of said acids, and a neutral oil resulting from the treatment with a sodium hydroxide solution of a resin formed by the reaction of sulfur dioxide and 2-butene.

14. In the preparation of an oil-resistant synthetic rubber product from a synthetic rubber consisting of a copolymer of 1,3-butadiene and methyl methacrylate, the improvement which comprises compounding such a synthetic rubber with from approximately 5 to 35 per cent by weight of a neutral oil resulting from the treatment with a sodium hydroxide solution of a resin formed by the reaction of sulfur dioxide and 2-butene.

15. A composition comprising a synthetic rubber consisting of a copolymer of a 1,3-butadiene hydrocarbon and acrylonitrile and from approximately 5 to 35 per cent by weight of a neutral oil resulting from the treatment with an alkaline solution of a resin formed by the reaction of sulfur dioxide and an olefin.

16. A composition comprising a synthetic rubber consisting of a copolymer of a 1,3-butadiene hydrocarbon and acrylonitrile and from approximately 5 to 35 per cent by weight of a neutral oil resulting from the treatment with an alkaline solution of a resin formed by the reaction of sulfur dioxide and an olefin having no double bond at a terminal carbon atom.

17. A composition comprising a synthetic rubber consisting of a copolymer of a 1,3-butadiene hydrocarbon and acrylonitrile and from approximately 5 to 35 per cent by weight of a neutral oil resulting from the treatment with a sodium hydroxide solution of a resin formed by the reaction of sulfur dioxide and 2-butene.

18. A composition comprising a synthetic rubber consisting of a copolymer of 1,3-butadiene and acrylonitrile and from approximately 5 to 35 per cent by weight of a neutral oil resulting from the treatment with a sodium hydroxide solution of a resin formed by the reaction of sulfur dioxide and 2-butene.

19. A composition comprising a synthetic rubber consisting of a copolymer of a 1,3-butadiene hydrocarbon and an ester of methacrylic acid and from approximately 5 to 35 per cent by weight of a neutral oil resulting from the treatment with an alkaline solution of a resin formed by the reaction of sulfur dioxide and an olefin.

20. A composition comprising a synthetic rubber consisting of a copolymer of a 1,3-butadiene hydrocarbon and an ester of methacrylic acid and from approximately 5 to 35 per cent by weight of a neutral oil resulting from the treatment with an alkaline solution of a resin formed by the reaction of sulfur dioxide and an olefin having no double bond at a terminal carbon atom.

21. A composition comprising a synthetic rubber consisting of a copolymer of a 1,3-butadiene hydrocarbon and an ester of methacrylic acid and from approximately 5 to 35 per cent by weight of a neutral oil resulting from the treatment with a sodium hydroxide solution of a resin formed by the reaction of sulfur dioxide and 2-butene.

22. A composition comprising a synthetic rubber consisting of a copolymer of 1,3-butadiene and methyl methacrylate and from approximately 5 to 35 per cent by weight of a neutral oil resulting from the treatment with a sodium hydroxide solution of a resin formed by the reaction of sulfur dioxide and 2-butene.

23. In the preparation of an oil-resistant synthetic rubber product from a synthetic rubber consisting of a copolymer of a 1,3-butadiene hydrocarbon and methacrylonitrile, the improvement which comprises compounding such a synthetic rubber with from approximately 5 to 35 per cent by weight of a neutral oil resulting from the treatment with an alkaline solution of a resin formed by the reaction of sulfur dioxide and an olefin.

24. In the preparation of an oil-resistant synthetic rubber product from a synthetic rubber consisting of a copolymer of 1,3-butadiene and methacrylonitrile, the improvement which comprises compounding such a synthetic rubber with from approximately 5 to 35 per cent by weight of a neutral oil resulting from the treatment with a sodium hydroxide solution of a resin formed by the reaction of sulfur dioxide and 2-butene.

25. A composition comprising a synthetic rubber consisting of a copolymer of a 1,3-butadiene hydrocarbon and methacrylonitrile and from approximately 5 to 35 per cent by weight of a neutral oil resulting from the treatment with an alkaline solution of a resin formed by the reaction of sulfur dioxide and an olefin.

26. A composition comprising a synthetic rubber consisting of a copolymer of 1,3-butadiene and methacrylonitrile and from approximately 5 to 35 per cent by weight of a neutral oil resulting from the treatment with a sodium hydroxide solution of a resin formed by the reaction of sulfur dioxide and 2-butene.

ROBERT D. SNOW.